Figure 1:
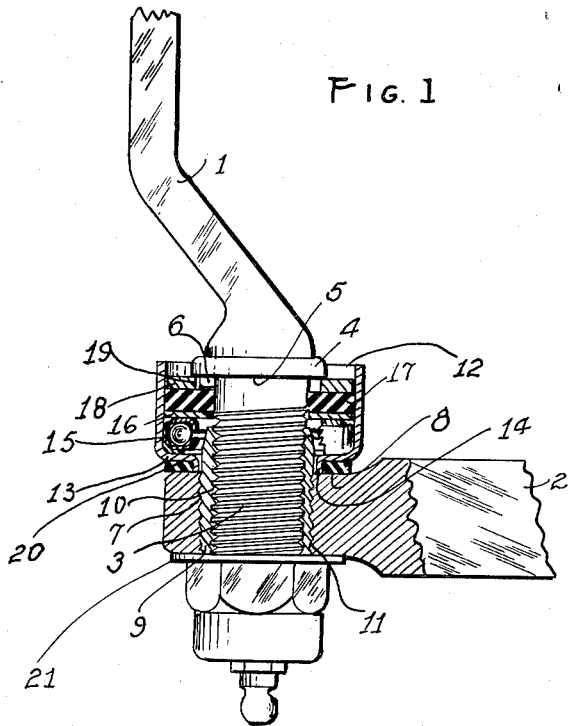

Aug. 17, 1965

M. A. MOSKOVITZ 3,201,157

SEALED IDLER ARM TENSION DEVICE

Original Filed Oct. 17, 1961

INVENTOR
MILTON A. MOSKOVITZ
By:
Ben V Zillman
ATTORNEY

United States Patent Office 3,201,157
Patented Aug. 17, 1965

3,201,157
SEALED IDLER ARM TENSION DEVICE
Milton A. Moskovitz, 7 Chapel Hill,
St. Louis County, Mo.
Continuation of application Ser. No. 147,413, Oct. 17, 1961. This application Nov. 21, 1963, Ser. No. 326,324
1 Claim. (Cl. 287—93)

The present invention relates to an interconnecting device for use in the steering system of automobiles and trucks, and more particularly in connection with the idler arm arrangements used in the same, and is a continuation of my patent application Serial No. 147,413, filed Oct. 17, 1961 and now abandoned.

Modern day vehicles, and particularly those equipped with independent front wheel suspension have, for the most part, adopted what is known as parallelogram linkage steering. Such type of steering consists mainly of a relay rod or center link that is approximately in the center of the car perpendicularly to the longitudinal axis of the vehicle, and which is connected at one extremity to the pitman arm that is in turn operably connected to the steering column. The opposite end of said rod is connected by an idler arm to the frame or chassis of the vehicle.

As the name implies, the function and purpose of the idler arm is to guide the relay rod along a predetermined path of travel resulting from the motion imparted thereto by the manually controlled pitman. Various other links such as tie rods are connected to the relay rod to, in turn, impart steering motion to the front wheels through suitable attachments.

In performing its function, the idler arm is called on to provide for oscillation or rotation about an axis at one of its ends, and at the same time prevent looseness or axial deflection which in turn could create erratic wheel behavior during driving. At the same time, provision must be had for preventing undue stresses that would occur through any mis-alignment of the associated parts. Currently, there are two main types of interconnections between said idler arms and relay rods, such being the threaded bushing arrangement and the bonded-to-rubber type.

This invention concerns itself with the threaded bushing type of arrangement, and has as one of its objects, to remove looseness in such an interconnection, while allowing for some mis-alignment of the members associated in the connection.

Another object of my invention is to resiliently cushion the device to remove looseness from the steering idler arm arrangement, isolate noise and vibration, and also aid in the taking up lost motion and wear between mating threads of the parts.

An added object of the invention is to provide a resilient rubber element retained within a rigid housing, to thereby limit and control flow of said element to be entirely within said housing, and to provide for a seal thereat.

A further object of my invention is to so construct such a connector unit that will, after being greased, retain the lubricant therein, and at the same time prevent entry of foreign matter into the associated parts.

A still further object of the invention is to construct the same to provide friction and tension through the flow of said rubber element, to thereby remove looseness between mating threads, and at the same time control the rigidity of the unit.

Many other objects and advantages of the construction herein shown and described, and the uses obtained, will be obvious to those skilled in the art to which this invention appertains and as will be apparent from the following disclosure.

To this end, my invention consists in the novel form, arrangement, construction and combination of parts herein shown and described, and the uses mentioned, all as will be more clearly pointed out in the claim hereunto appended.

Figure 2:
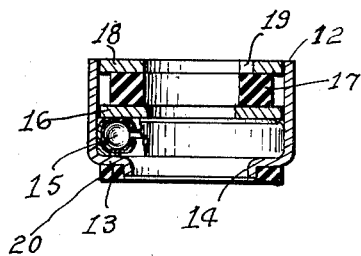

In the drawings, wherein like reference characters represent like or corresponding parts throughout the views, FIGURE 1 is a cross-section view of the connector unit as finally installed in place on the vehicle, the interconnected parts being shown fragmentally and partially in section; and FIGURE 2 is a cross-sectional detail of the connector unit.

Referring more particularly to the drawings, wherein there is illustrated a preferred embodiment of my invention, there is shown a pair of relatively oscillatable members 1 and 2, the first one of which is, for example, the bracket adapted to be fixed to the frame or chassis of the vehicle and has one end in the form of an elongated externally threaded plug 3 whose rear end has a transverse peripheral flange 4, the face of the latter that is nearest said threaded portion having an annular abutment portion 5, and in some cases there are one or more axially extending portions, projections of ribs 6 on said face.

The second member, as for example, a part of the steering linkage such as the idler arm, is generally provided with an internally threaded eye 7 that loosely permits passage of the plug therethrough and has an annular abutment surface or face 8 that surrounds said eye.

There is a third member 9 in the shape of an elongated sleeve, internally threaded at 10 to co-act with said external threads of the plug, said sleeve projecting axially toward said flange and beyond said abutment face 8 of said second member. The exterior of said third member is provided with external threads 11 that threadedly co-act with the interior threads of said eye. Ordinarily, the engaging threads of the first and third members are relatively coarse, say about eleven threads per inch.

In production, it is recognized that the threads must have tolerances, so that where the male thread is toward to low side of its tolerance range, and the female threads are near the high side of its range, considerable lost motion or play may be in evidence between said threads when in operative engagement. In addition, matching irregularities and roughness of surfaces will further exaggerate said play or looseness. Then, in use and as wear occurs, such looseness worsens until driving becomes so erratic as to be intolerable and even dangerous. Accordingly, this invention is designed to overcome such looseness and to maintain steering stability.

Briefly, the connector unit consists of a metal or other suitably rigid housing shaped to contain the various movable parts including a low-friction type bearing such as a ball-bearing of the thrust type and is so sealed at its ends to prevent entry of dirt and other foreign matter into the unit.

Secondly, suitable yieldably compressible means are arranged within the housing to hold the parts in intended functional relation and to reduce noise and vibration and to take up wear and mis-alignment thereat.

Such a unit comprises the cup-shaped housing aforesaid, having an annular wall that bounds and surrounds said plug when the unit is operably positioned, surrounding said third member portion that is within said housing and having it open end 12 preferably extending axially beyond the abutment face 5 of said flange and with its bottom wall 13 directed radially inwardly and thence directed axially or longitudinally to form a collar portion 14 that loosely encloses said outer peripheral surface of said third member.

As previously mentioned, this housing is of steel or other suitably rigid material able to withstand wear in service, and to be otherwise suitable for its purpose. Within said housing and adjacent the bottom wall 13 there is an annular low-friction type of bearing, such as the thrust type ball-bearing 15, arranged in said housing and loosely encircling the adjacent projecting end of the third member when the unit is in its mounted operative position.

A washer 16, of steel or other suitable rigid material is placed on that side of the ball-bearing that is farthest from the housing bottom and a yieldably resilient seal ring 17, of rubber or the like, is interposed in said housing between said washer and the open end of the housing. A second steel washer 18 is placed between said housing open end and said rubber ring.

Initially, the parts within the housing appear as indicated in FIG. 2, the rubber ring being of such size and shape that when the unit is in mounted position on the vehicle, as indicated in FIG. 1, said rubber ring will be sufficiently axially compressed and lie wholly within said housing to engage the side wall of the cup and the plug so as to exert friction therebetween and against the washer 16. The second washer 18 may be provided with one or more cut-outs 19 extending radially inwardly from its opening to accommodate the ribs of the plug to thereby interlock therewith and prevent any possible rotation between said plug and washer that might cause wear thereat.

It is thus seen that the connector device is sandwiched between the two abutment faces snugly, while being in a position to encircle the co-acting threads. A second resiliently yieldable rubber ring 20 may be interposed between the bottom of the cupped housing and the adjacent abutment surface 8 of the eyed member to provide a seal thereat and to assist in taking up vibration and reducing noise thereat.

In mounting the assembled unit into its operative position on the vehicle, to eliminate looseness at the oscillatory joint, said unit is first placed in approximately the position indicated in FIG. 1, and said third member is rotated sufficiently until all play is taken up and the rubber ring 17 forced into its compressed position and radially expanded sufficiently to cause the flanks or sides of the mating threads to engage one another in an efficient relationship and to remain in such constant engagement. Said rubber ring is thus compressed sufficiently to frictionally contact the plug extension to provide a seal that prevents dirt or other foreign matter from entering the unit thereat. Further, the radially outward expansion of the rubber ring limits the flow of the rubber and the pressure thereat on the threads, by completely enclosing and confining the rubber within the housing.

Further, stability is afforded to the cup by the expanded rubber, as well as functioning as a sealant in this area. The washer 16 also prevents flow of the rubber into the bearing. The washers and all internal parts within the housing itself are made with sufficient clearance to provide for some mis-alignment or non-concentric conditions that might exist between the threads and the surrounding surfaces.

In addition, such clearance will allow for a certain degree of misalignment between the parts that might exist through the coupling of the idler arm to the frame bracket, or to the relay rod.

The extra rubber ring surrounding the collar of the housing not only serves as a seal at this end, but together with said first rubber ring, isolates noise and vibration in the connector unit, balances pressure at both ends of the same, and prevents back-lash on the mating threads.

Thus, in effect, if one of the resilient rings should fail or be insufficient for the job, the second ring will pick up this deficiency and improve the safety of the device.

In service, and after installation of the unit at the joint, the rubber rings will continue to exert pressure for a long time to prevent looseness between the parts. Customarily, the unit is so assembled to the members, that tightening up the nut for about a one-quarter or a one-half turn beyond that needed for proper tensioning is accomplished, and then the nut is backed off slightly to provide the resultant desired amount of tension or friction thereat.

In the event that a firmer tuned adjustment is needed, or when too much wear occurs, one or more shims 21 are provided for insertion between the eyeportion of the idler arm and the wrench-engaging portion of the sleeve, to re-orient the engaged threads. Thus, it is possible to provide a custom-tuned job to a predetermined degree of tensioning for each installation.

I claim:

A device adapted for adjustably tensioning an oscillatory interconnection between a first and a second member, said first member having an externally threaded plug that has a peripheral flange at its rear as an annular abutment face, said second member provided with an internally threaded eye for passage of said plug therethrough and with an annular abutment face about said eye, and a third member having external threads to cooperably engage the threads of said eye and internal threads cooperably receiving said plug; said device interposable between said abutment faces and including a cupped housing having a first open end to be adjacent said flange and with a radially inwardly-directed annular portion at its other end to be opposed to said abutment face of said second member, said last-mentioned annular portion of said housing terminating in an axially extending collar, low-friction bearing means in said housing to be about said third member, a yieldably compressible ring entirely within said housing to be between said bearing means and the opposed abutment face of said flange and adjustably engage the lateral bounding wall of said open end of said housing and the plug as a seal thereat and be radially compressed to constantly exert axial thrust between said bearing means and flange and be forced toward said bearing means by the rotation of the plug in the direction of the threaded opening in the third member, and a second yieldably compressible ring encircling said collar to engage the opposed faces of the annular abutment face about said eye and said other end of said cup and serve as a seal thereat.

References Cited by the Examiner

UNITED STATES PATENTS

| | | | |
|---|---|---|---|
| 2,023,718 | 12/35 | Adams | 308—187.2 |
| 2,689,756 | 9/54 | Carlson | 287—93 |
| 2,805,878 | 9/57 | Traugott | 287—93 |
| 2,826,466 | 3/58 | Pritchard. | |
| 3,010,771 | 11/61 | Cogger | 308—187.2 |

CARL W. TOMLIN, *Primary Examiner.*